United States Patent
Sheng et al.

(10) Patent No.: US 8,674,665 B2
(45) Date of Patent: Mar. 18, 2014

(54) PROTECTION DEVICE AND PROTECTION METHOD FOR THROUGH POWER NETWORK FAULT OF DOUBLE-FED INDUCTION GENERATOR

(75) Inventors: Xiaojun Sheng, Shenzhen (CN); Zhihua Wang, Shenzhen (CN); Quanbo Xia, Shenzhen (CN); Jianyou Zeng, Shenzhen (CN); Dansheng Zhou, Shenzhen (CN); Ronghui Liao, Shenzhen (CN)

(73) Assignee: Shenzhen Hopewind Electric Co. Ltd., Shenzhen (CN)

( * ) Notice: Subject to any disclaimer, the term of this patent is extended or adjusted under 35 U.S.C. 154(b) by 493 days.

(21) Appl. No.: 13/125,723

(22) PCT Filed: Jul. 23, 2010

(86) PCT No.: PCT/CN2010/075419
§ 371 (c)(1),
(2), (4) Date: Apr. 22, 2011

(87) PCT Pub. No.: WO2011/015105
PCT Pub. Date: Feb. 10, 2011

(65) Prior Publication Data
US 2011/0215772 A1    Sep. 8, 2011

(30) Foreign Application Priority Data
Aug. 7, 2009    (CN) .......................... 2009 1 0109535

(51) Int. Cl.
*H02P 9/04*    (2006.01)
(52) U.S. Cl.
USPC ............................................. 322/37; 290/44
(58) Field of Classification Search
USPC .................... 322/28, 37, 47; 290/44
See application file for complete search history.

(56) References Cited

U.S. PATENT DOCUMENTS

| | | | | |
|---|---|---|---|---|
| 5,798,631 A * | 8/1998 | Spee et al. | ...................... | 322/25 |
| 7,372,174 B2 * | 5/2008 | Jones et al. | ..................... | 290/44 |
| 7,511,385 B2 * | 3/2009 | Jones et al. | ..................... | 290/43 |
| 7,692,321 B2 * | 4/2010 | Jones et al. | ..................... | 290/43 |
| 7,755,209 B2 * | 7/2010 | Jones et al. | ..................... | 290/44 |

(Continued)

*Primary Examiner* — Nicholas Ponomarenko
(74) *Attorney, Agent, or Firm* — Mei & Mark LLP (57) ABSTRACT

The invention discloses a power grid fault ride-through device and a method for a doubly fed induction generator. The device comprises a controller and a crowbar circuit, the controller is in controlled connection with a generator-side converter and a grid-side converter of the doubly fed induction generator and the crowbar circuit, a three-phase input end of the crowbar circuit is connected with a connection end of a du/dt inductance and the generator-side converter, the crowbar circuit comprises a switch circuit and a drive circuit which is in driving connection with the switch circuit, the controller is in controlled connection with the drive circuit, the switch circuit comprises a bridge circuit comprising full-controlled power electronic devices as constituent elements, and a three-phase input end of the switch circuit is connected to the three-phase input end of the crowbar circuit; and with the device, the method comprises the following steps of closing the generator-side converter and triggering the conduction of the switch circuit in case that a power grid dips to the condition that rotor current is equal to or larger than a conduction threshold value, and switching off the switch circuit in case that rotor current is equal to or smaller than a switch-off threshold value. The invention prolongs the service life of the crowbar circuit and improves the working reliability of the crowbar circuit, and has simple structure and easy implementation.

19 Claims, 5 Drawing Sheets

(56) References Cited

U.S. PATENT DOCUMENTS

| | | | |
|---|---|---|---|
| 7,888,915 B2 * | 2/2011 | Zhao et al. | 322/47 |
| 2009/0189393 A1 * | 7/2009 | Tyagi et al. | 290/44 |
| 2010/0142237 A1 * | 6/2010 | Yuan et al. | 363/97 |
| 2012/0262129 A1 * | 10/2012 | Lu et al. | 322/28 |

* cited by examiner

PROTECTION DEVICE AND PROTECTION METHOD FOR THROUGH POWER NETWORK FAULT OF DOUBLE-FED INDUCTION GENERATOR

FIELD OF THE INVENTION

The invention relates to a system fault protection device for a doubly fed induction generator, and further to a system fault protection method, using the device, for a doubly fed induction generator, more specifically to a power grid fault ride-through device and a method for a doubly fed induction generator.

BACKGROUND OF THE INVENTION

As a novel energy characterized by cleanness, reproducibility and enormous potential, wind power is rapidly developed throughout the world in the aspect of power generation. Wind power generator system based on the doubly fed induction generator becomes commercially dominant. Shown as FIG. 1, a stator side of a generator 10 is directly connected with a power grid 20 and a rotor side is connected with the power grid via converters. In general, the converter can be divided into a grid-side converter 60 connected with the power grid and a generator-side converter 40 connected with a du/dt inductance 80 which is connected to a generator rotor, and the generator-side converter 40 is connected with the grid-side converter 60 via a direct current bus (and a direct current bus capacitance 50). The converters 40 and 60 are controlled by a controller 70. The controller 70 controls the current at the rotor side of the generator via the converters in order to control active power and reactive power of the generator.

As the installation capacity increases continuously, the proportion of the power generation capacity of the wind power generator system in the power grid gets higher and higher. In the event that the dip fault of the power grid occurs, the wind power generator system is disengaged from the power grid and comes to a halt so as not to provide frequency and voltage support for the power grid, thereby disfavoring safe operation of the power grid extremely. Therefore, nations all over the world successively come up with a series of operating standards for the wind power generator system, including the power grid fault ride-through ability, i.e., when instant dip of the power grid occurs, the wind power generator system is required to maintain the grid-connected state, and provides certain reactive power support during the fault in order to help recover the power grid as much as possible.

Since stator power is indirectly controlled by controlling rotor current and the doubly fed induction generator the stator of which is directly connected to the power grid is directly impacted by the power grid, the wind power generator system based on the doubly fed induction generator is quite sensitive to disturbance of the power grid so that the system, during the power grid fault, is harder in control, and even out of control. In case of the instant dip of the power grid, demagnetizing process is formed in the generator, and this process leads to rapid rise of the stator current and the rotor current. In case of the large dip of the power grid, overcurrent occurs in the stator and the rotor, and the converters will be destroyed if additional measures are not adopted.

In order to solve the above problem, the technical way that a passive crowbar circuit is arranged is adopted in the prior art. Shown as FIG. 1, in general, a passive crowbar circuit 30 is connected in parallel to the front end of the du/dt inductance 80 (i.e. between the du/dt inductance 80 and a rotor winding of the doubly fed induction generator 10).

Figure 2:
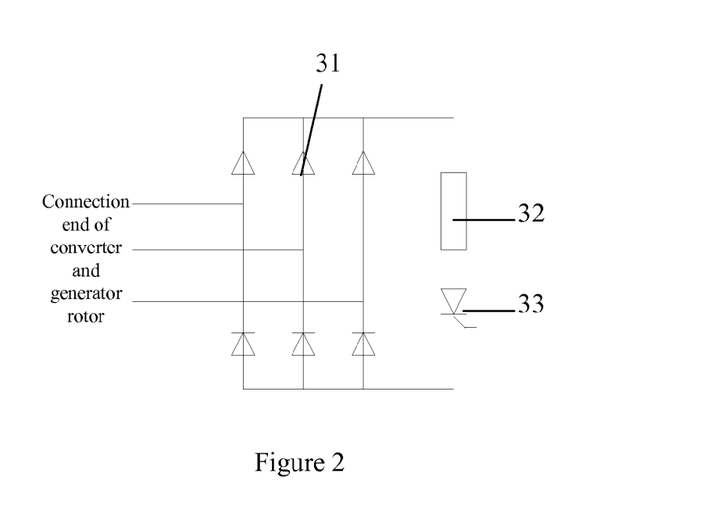
FIG. 2 is a circuit diagram of a current passive crowbar circuit.

Shown as FIG. 2, the passive crowbar circuit 30 is composed of a three-phase uncontrolled rectifier bridge, which is composed of diodes 31, and an energy consumption resistance 32 and a thyristor 33 or other half-controlled power electronic devices, which are serially connected to a direct current side of the rectifier bridge. In case of the instant dip of the power grid, the thyristor 33 in the passive crowbar circuit is triggered to achieve conduction and the generator rotor is short-circuited so that the converters 40 and 60 are disengaged from the grid and come to a halt fast, thereby achieving the purpose of protecting the converters.

However, the half-controlled power electronic devices adopted by the passive crowbar circuit are subject to conduction upon the power grid power fault, and after the converters are protected, cannot be switched off before the energy of the generator rotor winding is depleted, thus the half-controlled power electronic devices cannot be switched off before the converters are disengaged from the power grid and the residual energy of the generator rotor winding is depleted, in this case, the power grid fault power occurs, and the generator cannot operate continuously, namely, the generator does not include the ability of power grid fault ride-through.

Figure 3:
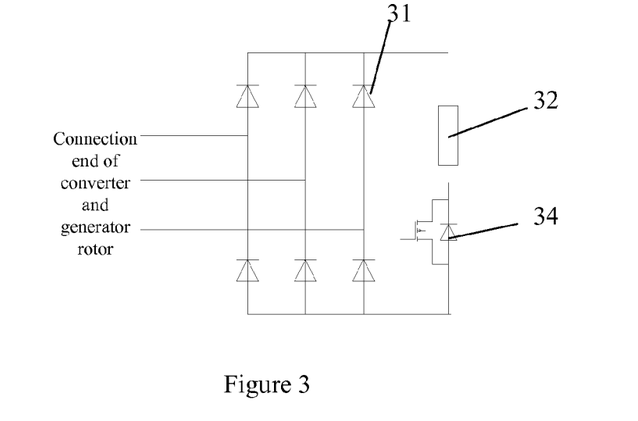
FIG. 3 is a circuit diagram of a current active crowbar circuit.

In order to solve the problem, an active crowbar circuit is provided. What is shown as FIG. 3 is the active crowbar circuit used commonly at present, the active crowbar circuit is composed of the three-phase uncontrolled rectifier bridge, which is composed of diodes 31, and the energy consumption resistance 32 and a full-controlled power electronic device 34, which are serially connected to the direct current side of the rectifier bridge. In case of voltage dip fault of the power grid, the controller 70 switches off the generator-side converter 40, the active crowbar circuit is simultaneously triggered to achieve conduction, and the generator rotor is short-circuited, thereby protecting the generator-side converter 40. In case that instantaneous energy generated by the power grid power fault attenuates to a set value, the controller 70 switches off the active crowbar circuit and the generator-side converter 40 is simultaneously switched on to provide reactive power support for the power grid 20 and help recover the power grid fast, thereby achieving power grid fault ride-through.

Figure 1:
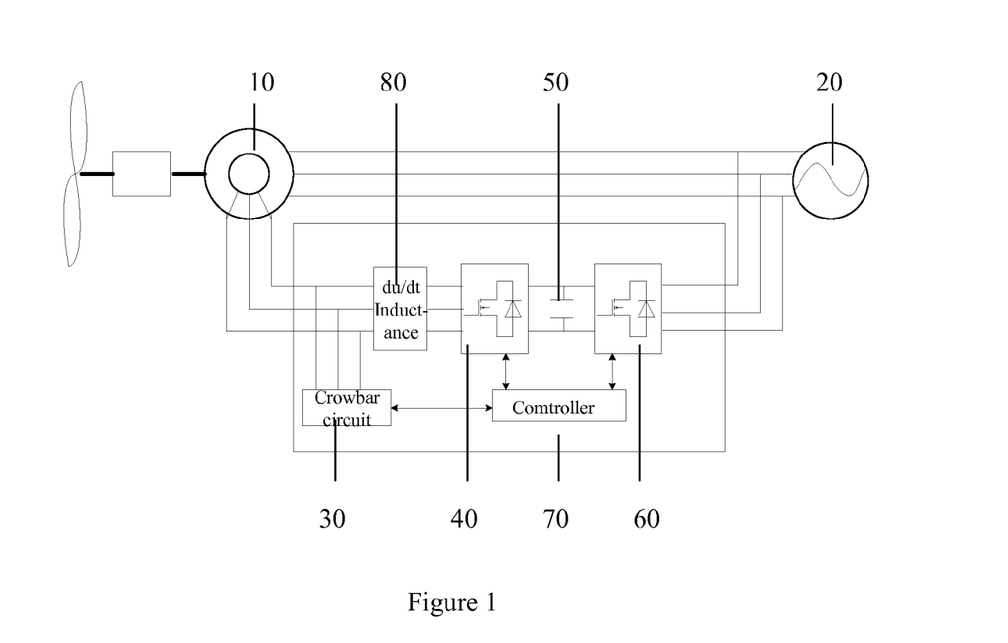
FIG. 1 is a schematic diagram of the current doubly fed induction generator system equipped with the crowbar circuit.

The active crowbar circuit solves the problems of the passive crowbar circuit, but the following defects are still present:

1. when the active crowbar circuit is connected between the du/dt inductance 80 and the rotor winding of the doubly fed induction generator 10, shown as FIG. 1, the current, which flows through the crowbar circuit and the generator rotor winding formerly, continuously flows via loops of the du/dt inductance and the generator-side converter at the moment the active crowbar circuit is switched off under the control of the controller 70; no current flows inside the du/dt inductance 80 during the conduction of the crowbar circuit, and when the crowbar circuit is switched off, the current flowing through the du/dt inductance 80 increases instantaneously to generate quite high terminal voltage at two ends of the du/dt inductance 80, so that a high voltage is also generated at an input end of the crowbar circuit connected with the du/dt inductance 80, and if the high voltage cannot be eliminated timely, it may break through the full-controlled power electronic device 34 at the direct current side of the crowbar circuit, reducing the operating reliability of the active crowbar circuit.

Figure 4:
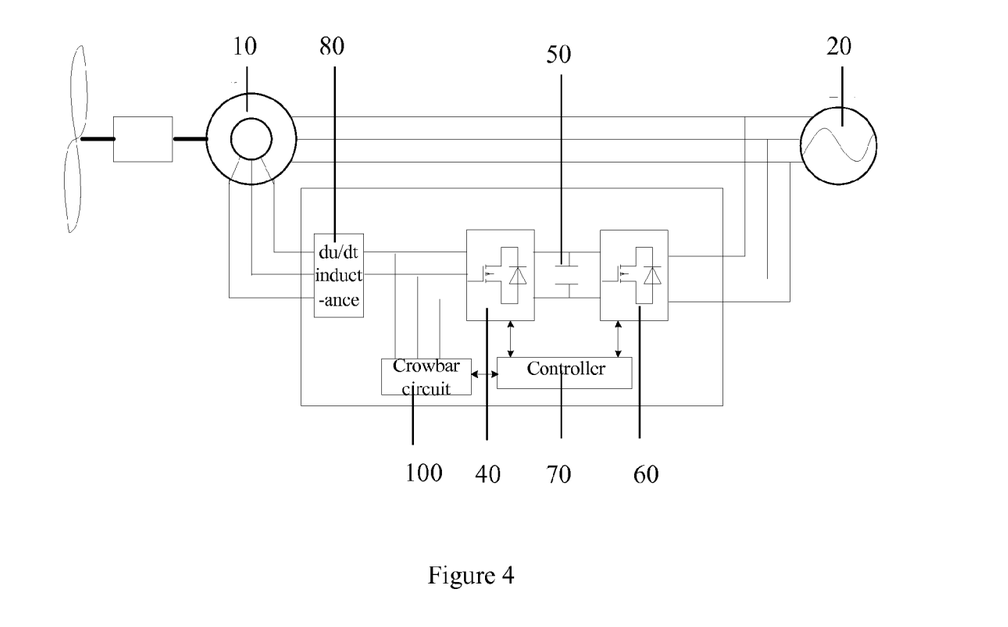
FIG. 4 is a schematic diagram of the doubly fed induction generator system equipped with the power grid fault ride-through device for doubly fed induction generator according to the invention.

2. when the active crowbar circuit is connected between the du/dt inductance 80 and the generator-side converter 40, shown as FIG. 4, such a connection way can relieve the high voltage generated at the input end of the crowbar circuit during the switch-off of the crowbar circuit, however, an output end of the generator-side converter 40 outputs a voltage pulse with high frequency and high amplitude during normal operation of the generator system, and as the reverse recovery time of the diodes 31 forming the uncontrolled rectifier bridge in the active crowbar circuit is long in general, the voltage pulse with high frequency and high amplitude acts on the diodes 31 lastingly to lead the diodes to heat accumulation, and the service life of the diodes 31 is greatly shortened in case of long-term operation, thus the service life of the active crowbar circuit is tremendously limited.

SUMMARY OF THE INVENTION

One technical problem to be solved by the invention lies in providing a power grid fault ride-through device for doubly fed induction generator, overcoming the defects in the prior art and prolonging the service life of the active crowbar circuit and improving the working reliability of the active crowbar circuit Another technical problem to be solved by the invention lies in providing a power grid fault ride-through method for doubly fed induction generator, overcoming the defects in the prior art and prolonging the service life of the active crowbar circuit and improving the working reliability of the active crowbar circuit The technical proposal adopted for solving the first technical problem is as below: a power grid fault ride-through device for doubly fed induction generator is constructed, which comprises a controller and a crowbar circuit, the controller is in controlled connection with a generator-side converter and a grid-side converter of the doubly fed induction generator and the crowbar circuit, a three-phase input end of the crowbar circuit is connected with a connection end of a du/dt inductance and the generator-side converter, the crowbar circuit comprises a switch circuit and a drive circuit which is in driving connection with the switch circuit, the controller is in controlled connection with the drive circuit, the switch circuit comprises a bridge circuit comprising full-controlled power electronic devices as constituent elements, and a three-phase input end of the switch circuit is connected to the three-phase input end of the crowbar circuit.

In the power grid fault ride-through device for doubly fed induction generator according to the invention, the switch circuit comprises a full bridge circuit comprising the full-controlled power electronic devices as constituent elements.

In the power grid fault ride-through device for doubly fed induction generator according to the invention, the switch circuit comprises a half bridge circuit comprising the full-controlled power electronic devices as constituent elements.

In the power grid fault ride-through device for doubly fed induction generator according to the invention, the crowbar circuit comprises an energy consumption resistance connected to the three-phase input end of the switch circuit.

In the power grid fault ride-through device for doubly fed induction generator according to the invention, the crowbar circuit comprises a detection circuit, which is in signal connection with the controller and the energy consumption resistance, respectively.

In the power grid fault ride-through device for doubly fed induction generator according to the invention, the crowbar circuit comprises a filter circuit, a three-phase input end of the filter circuit is connected to a three-phase connection end of the switch circuit at which the switch circuit is connected with the energy consumption resistance.

In the power grid fault ride-through device for doubly fed induction generator according to the invention, the crowbar circuit comprises an energy consumption resistance, a detection circuit and a filter circuit, wherein the energy consumption resistance is connected to a three-phase input end of the switch circuit, the detection circuit is in signal connection with the controller and the energy consumption resistance, respectively, and the three-phase connection end of the filter circuit is connected to the three-phase connection end of the switch circuit at which the switch circuit is connected with the energy consumption resistance.

The technical proposal adopted for solving the second technical problem is as below: a power grid fault ride-through method for doubly fed induction generator is provided, which comprises a power grid fault ride-through device for doubly fed induction generator, the device comprises a controller and a crowbar circuit, the controller is in controlled connection with a generator-side converter and a grid-side converter of the doubly fed induction generator and the crowbar circuit, a three-phase input end of the crowbar circuit is connected with a connection end of the du/dt inductance and the generator-side converter, the crowbar circuit comprises a switch circuit and a drive circuit which is in driving connection with the switch circuit, the controller is in controlled connection with the drive circuit, the switch circuit comprises a bridge circuit comprising full-controlled power electronic devices as constituent elements, and a three-phase input end of the switch circuit is connected to the three-phase input end of the crowbar circuit;

The method comprises:

In case that the voltage of a power grid dips to the condition that rotor current of the doubly fed induction generator rises to be equal to or larger than a set conduction threshold value of the crowbar circuit, the controller switches off the generator-side converter and triggers the crowbar circuit to achieve the conduction of the switch circuit in the crowbar circuit;

and in case that the rotor current of the doubly fed induction generator attenuates to be equal to or smaller than a set switch-off threshold value of the crowbar circuit, the controller switches off the crowbar circuit to switch off the switch circuit in the crowbar circuit and switch on the generator-side converter in order to provide reactive power support for the power grid fast and help recover the power grid.

In the power grid fault ride-through method for doubly fed induction generator according to the invention, the switch circuit comprises a full bridge circuit or a half bridge circuit comprising the full-controlled power electronic devices as constituent elements.

Compared with the prior art, implementation of the power grid fault ride-through device and method for doubly fed induction generator according to the invention has the beneficial effects that:

1. the input end of the crowbar circuit is connected between the du/dt inductance and the generator-side converter, which avoids the damage of the high voltage, which is generated by the du/dt inductance in case of the switch-off of the crowbar circuit, to the full-controlled power electronic device; simultaneously, since the full-controlled power electronic device, as the constituent element of the full-bridge switch circuit or the half-bridge switch circuit, has the characteristic of fast recovery, the voltage pulse output by the generator-side converter results in small heat accumulation on the full-controlled power electronic device during normal operation of the generator system, having no influence on operation service life of the full-controlled power electronic device and further prolonging the service life of the crowbar circuit and improving the working reliability of the crowbar circuit;

2. the structure is simple and the implementation is easy.

BRIEF DESCRIPTION OF THE DRAWINGS

Further description is made below to the invention with reference to the drawings and the embodiments, in the drawings.

DETAILED DESCRIPTION OF THE INVENTION

Embodiment 1

Figure 5:
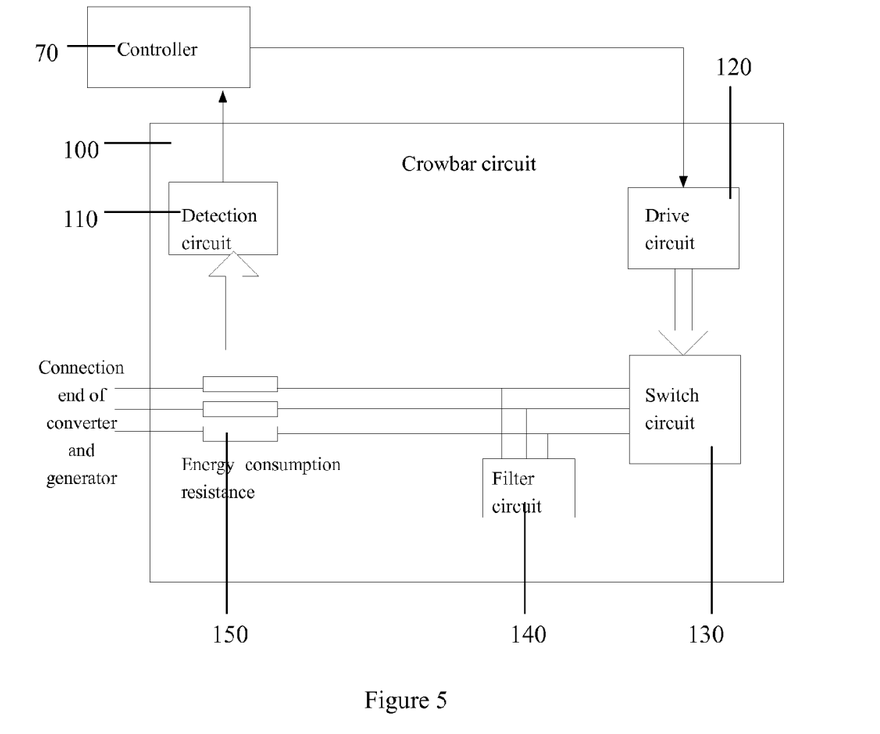
FIG. 5 is a structural schematic diagram of embodiment 1 of the power grid fault ride-through device for doubly fed induction generator according to the invention.

Shown as FIG. 4 and FIG. 5, the power grid fault ride-through device for doubly fed induction generator according to the invention comprises a controller 70 and a crowbar circuit 100.

The controller 70 is in controlled connection with a generator-side converter 40 and a grid-side converter 60 of the doubly fed induction generator and the crowbar circuit 100.

A three-phase input end of the crowbar circuit 100 is connected with a connection end of the du/dt inductance 80 and the generator-side converter 40.

Shown as FIG. 5, the crowbar circuit 100 comprises a switch circuit 130, a drive circuit 120, a filter circuit 140, an energy consumption resistance 150 and a detection circuit 110. The drive circuit 120 is in driving connection with the switch circuit 130, the energy consumption resistance 150 is connected to a three-phase input end of the switch circuit 130, a three-phase connection end of the filter circuit 140 is connected to a three-phase output end at which the switch circuit 130 is connected with the energy consumption resistance 150, and the detection circuit 110 is in signal connection with the energy consumption resistance 150. The controller 70 is in signal connection with the detection circuit 110 and in controlled connection with the drive circuit 120, and the three-phase input end of the energy consumption resistance 150 is connected to a connection end at which the generator-side converter 40 is in three-phase connection with the rotor of the doubly fed induction generator 10.

The detection circuit 110, the drive circuit 120, the filter circuit 140 and the energy consumption circuit 150 adopt the current circuit and resistance.

Figure 6:
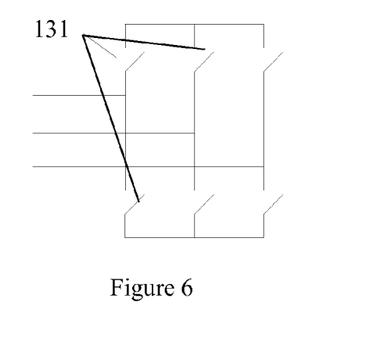
FIG. 6 is a circuit diagram of the implementation way 1 of the switch circuit in the power grid fault ride-through device for doubly fed induction generator according to the invention.

Shown as FIG. 6, the switch circuit 130 can adopt the full bridge switch circuit comprising the full-controlled power electronic devices (e.g. IGBT (Insulated Gate Bipolar Transistor), IGCT (Integrated Gate Commutated Thyristors) etc.) 131, a drive end of each full-controlled power electronic device is connected with a control end of the drive circuit 120, achieving the control of conduction and switch-off of the full-controlled power electronic devices.

The full bridge switch circuit comprising the full-controlled power electronic devices 131 can be provided with an absorption circuit (e.g. absorption capacitance, etc.), which absorbs the terminal voltage spike of the full-controlled power electronic devices in order to protect the full-controlled power electronic devices.

Figure 7:
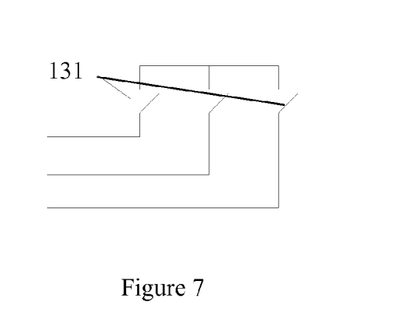
FIG. 7 is a circuit diagram of the implementation way 2 of the switch circuit in the power grid fault ride-through device for doubly fed induction generator according to the invention.

Shown as FIG. 7, the switch circuit 130 can also adopt the half bridge switch circuit comprising the full-controlled power electronic devices 131, and the purpose of the invention can be achieved.

Also, the half bridge switch circuit comprising the full-controlled power electronic devices 131 can be also provided with the absorption circuit (e.g. absorption capacitance, etc.), which absorbs the terminal voltage spike of the full-controlled power electronic devices in order to protect the full-controlled power electronic devices.

In case of the voltage dip fault of the power grid, when detecting that the rotor current of the doubly fed induction generator rises to be equal to or larger than a set conduction threshold value of the active crowbar circuit (this value is preset according to design requirement), the controller 70 controls the drive circuit 120 to drive the switch circuit 130 to achieve conduction (i.e. the full-controlled power electronic devices 131 in the switch circuit 130 are driven to achieve conduction), and to switch off the generator-side converter 40 to protect the generator-side converter 40; when the rotor current of the doubly fed induction generator attenuates to be equal to or smaller than a set switch-off threshold value of the active crowbar circuit (this value is preset according to design requirement), the detection circuit 110 detects an electric signal (current signal or voltage signal) of the energy consumption resistance 150, obtains a signal that the rotor current attenuates to be equal to or smaller than the set switch-off threshold value of the active crowbar circuit, and transfers the signal to the controller 70, and the controller 70 controls the drive circuit 120 according to the signal to switch off the switch circuit 130 (i.e. the full-controlled power electronic devices 131 in the switch circuit 130 are driven to be switched off), and to switch on the generator-side converter 40 in order to provide reactive power support for the power grid fast and help recover the power grid.

The filter circuit 140 absorbs the voltage spike during system operation in order to ensure the safety of the full-controlled power electronic devices 131 in the crowbar circuit.

Embodiment 2

This embodiment is basically identical to embodiment 1, with the difference as below: the crowbar circuit comprises a switch circuit 130 and a drive circuit 120 which is in driving connection with the switch circuit 130, the controller 70 is in controlled connection with the drive circuit 120, and the three-phase input end of the switch circuit 130 is the three-phase input end of the crowbar circuit 100.

The crowbar circuit in this embodiment is not provided with the detection circuit 110, the energy consumption resistance 150 and the filter circuit 140, but achieving the purpose of the invention is not influenced.

When the crowbar circuit 100 is not provided with the detection circuit 110, the switch-off of the switch circuit 130 is implemented in a manner as below:

The controller 70 detects whether the dip fault of the power grid is symmetric or asymmetric, when symmetric dip of the power grid occurs, the controller 70 detects that conduction time of the crowbar circuit 100 is larger than or equal to setting time T (the setting time T is set according to generator system parameters, and when the time T is reached, crowbar current (i.e. the current at the input end of the switch circuit) corresponding to the crowbar circuit restores to a switchable-off threshold value of the switch circuit 130), the drive circuit 120 is controlled to switch off the switch circuit 130.

When asymmetric dip of the power grid occurs, the controller 70 detects the conduction time of the crowbar circuit 100 and the degree of unbalancedness of the power grid voltage (the degree of unbalancedness of three-phase voltage in a three-phase power system is represented by the percentage of root-mean-square value of negative sequence component and positive sequence component of the power grid voltage), when the condition that the conduction time of the crowbar circuit 100 is larger than or equal to the setting time T and the degree of unbalancedness of the power grid voltage is equal to or smaller than a setting value of the degree of unbalancedness simultaneously is met, the drive circuit 120 is controlled to switch off the switch circuit 130.

When the crowbar circuit 100 is not provided with the energy consumption resistance 150, the input end of the switch circuit 130 is directly connected to the connection end at which the generator-side converter 40 is in three-phase connection with the rotor of the doubly fed induction generator 10, thus energy attenuation is directly achieved via the stator resistance and the rotor resistance of the generator.

Embodiment 3

The power grid fault ride-through device for doubly fed induction generator in this embodiment comprises a controller 70 and a crowbar circuit 100, the crowbar circuit 100 comprises a switch circuit 130, a drive circuit 120 and an energy consumption resistance 150, the drive circuit 120 is in driving connection with the switch circuit 130, the energy consumption resistance 150 is connected to the three-phase input end of the switch circuit 130. The controller 70 is in controlled connection with the drive circuit 120, and the three-phase input end of the energy consumption resistance 150 is the three-phase input end of the crowbar circuit 100.

Embodiment 4

The power grid fault ride-through device for doubly fed induction generator in this embodiment comprises a controller 70 and a crowbar circuit 100, the crowbar circuit 100 comprises a switch circuit 130, a drive circuit 120, a filter circuit 140 and an energy consumption resistance 150, the drive circuit 120 is in driving connection with the switch circuit 130, the energy consumption resistance 150 is connected to the three-phase input end of the switch circuit 130 and the three-phase connection end of the filter circuit 140 is connected to the three-phase connection end at which the switch circuit 130 is connected with the energy consumption resistance 150. The controller 70 is in controlled connection with the drive circuit 120, and the three-phase input end of the energy consumption resistance 150 is the three-phase input end of the crowbar circuit 100.

Embodiment 5

The power grid fault ride-through device for doubly fed induction generator in this embodiment comprises a controller 70 and a crowbar circuit 100, the crowbar circuit 100 comprises a switch circuit 130, a drive circuit 120, a detection circuit 110 and an energy consumption resistance 150, the drive circuit 120 is in driving connection with the switch circuit 130, the energy consumption resistance 150 is connected to the three-phase input end of the switch circuit 130 and the detection circuit 110 is in signal connection with the energy consumption resistance 150. The controller 70 is in signal connection with the detection circuit 110 and is in controlled connection with the drive circuit 120, and the three-phase input end of the energy consumption resistance 150 is the three-phase input end of the crowbar circuit 100.

The power grid fault ride-through method for doubly fed induction generator according to the invention is implemented by the power grid fault ride-through device for doubly fed induction generator:

In case that the voltage of the power grid dips to the condition that the rotor current of the doubly fed induction generator rises to be equal to or larger than the set conduction threshold value of the crowbar circuit (this conduction threshold value is set according to generator system parameters), the controller 70 switches off the generator-side converter 40 and triggers the crowbar circuit 100 to achieve the conduction of the switch circuit 130 in the crowbar circuit, thereby protecting the generator-side converter 40.

And in case that the rotor current of the doubly fed induction generator attenuates to be equal to or smaller than the set switch-off threshold value of the crowbar circuit (this conduction threshold value is set according to generator system parameters), the controller 70 switches off the crowbar circuit 100 to switch off the switch circuit 130 in the crowbar circuit and switches on the generator-side converter 40 in order to provide reactive power support for the power grid fast and help recover the power grid.

Specific description is made below to the power grid fault ride-through method for doubly fed induction generator according to the invention in case of symmetric dip fault and asymmetric dip fault of the power grid:

On the assumption that the rated power of the generator is 1.5 MW, the nominal voltage of the stator is 690V, the open voltage of the rotor is 2100V, and the system operates normally prior to the power grid fault. On the assumption that, at 3.5 s, the symmetric dip of the power grid voltage accounts for 20% of original power grid voltage, the generator rotor current rises rapidly, and when the set threshold value at which the active crowbar circuit is triggered is reached, the controller 70 switches off the generator-side converter 40 and triggers the crowbar circuit 100. Afterwards, the stator current and the rotor current of the generator attenuate lastingly through the energy consumption resistance 150, and after the detection circuit 110 judges that the rotor current of the generator is lower than the set threshold value, the controller 70, at about 3.75 s, switches off the crowbar circuit and switches on the generator-side converter 40 once again to provide reactive power support fast and help recover the power grid. At 4.2 s, the power grid is recovered (the fault lasts 600 ms in total), and the system stops reactive power support and starts normal power generation fast.

Figure 8:
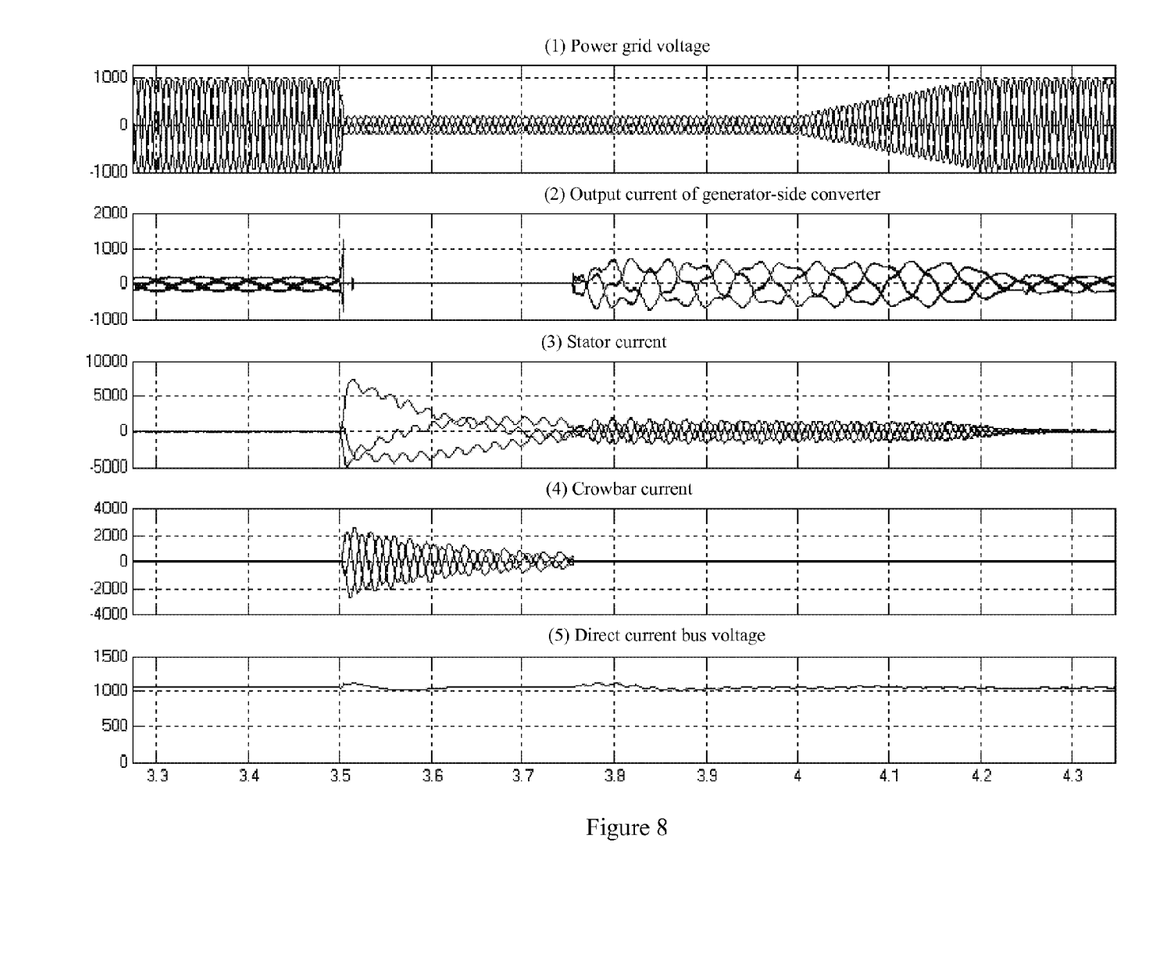
FIG. 8 is a waveform diagram of voltage waveform of the power grid, output current waveform of the generator-side converter, current waveform of the generator stator, current waveform on the energy consumption resistance of the crowbar device and voltage waveform of the direct current bus in the doubly fed induction generator system adopting the power grid fault ride-through device for doubly fed induction generator according to the invention, in case of symmetric dip fault of the power grid.

In the above process, various key voltage and current waveforms are shown as FIG. 8, wherein (1) is the waveform of the power grid voltage, (2) is the waveform of the output current of the generator-side converter, (3) is the waveform of the generator stator current, (4) is the current waveform on the energy consumption resistance of the crowbar device, and (5) is the waveform of the direct current bus voltage.

On the assumption that the rated power of the generator is 1.5 MW, the nominal voltage of the stator is 690V, the open voltage of the rotor is 2100V, and the system operates normally prior to the power grid fault. On the assumption that, at 3.5 s, phase A voltage of the power grid dips to 20% of the nominal voltage, and phase B voltage and phase C voltage remain unchanged. The generator rotor current rises rapidly, and when the set threshold value at which the crowbar circuit is triggered is reached, the controller 70 switches off the generator-side converter 40 and triggers the crowbar circuit 100.

Afterwards, the stator current and the rotor current of the generator attenuate to a certain extent through the energy consumption resistance 150, and large negative sequence voltage component in the power grid results in high excitation voltage at the rotor side of the generator and the generator-side converter 40 is incapable of providing such high voltage for balance, so during this time, the generator rotor current cannot attenuate to the set threshold value and the system still cannot switch off the crowbar circuit and switch on the generator-side converter. At 3.8 s (phase A dips dramatically to 300 ms), the phase A voltage of the power grid starts recovery; at 3.9 s, the phase A voltage is recovered to 70% of the nominal voltage, negative sequence voltage in the power grid is reduced to a certain extent, the system switches off the crowbar circuit 100 and switches on the converter 40 once again to provide reactive power support fast and help recover the power grid. At 4.2 s, the power grid is completely recovered, and the system stops reactive power support and starts normal power generation fast.

Figure 9:
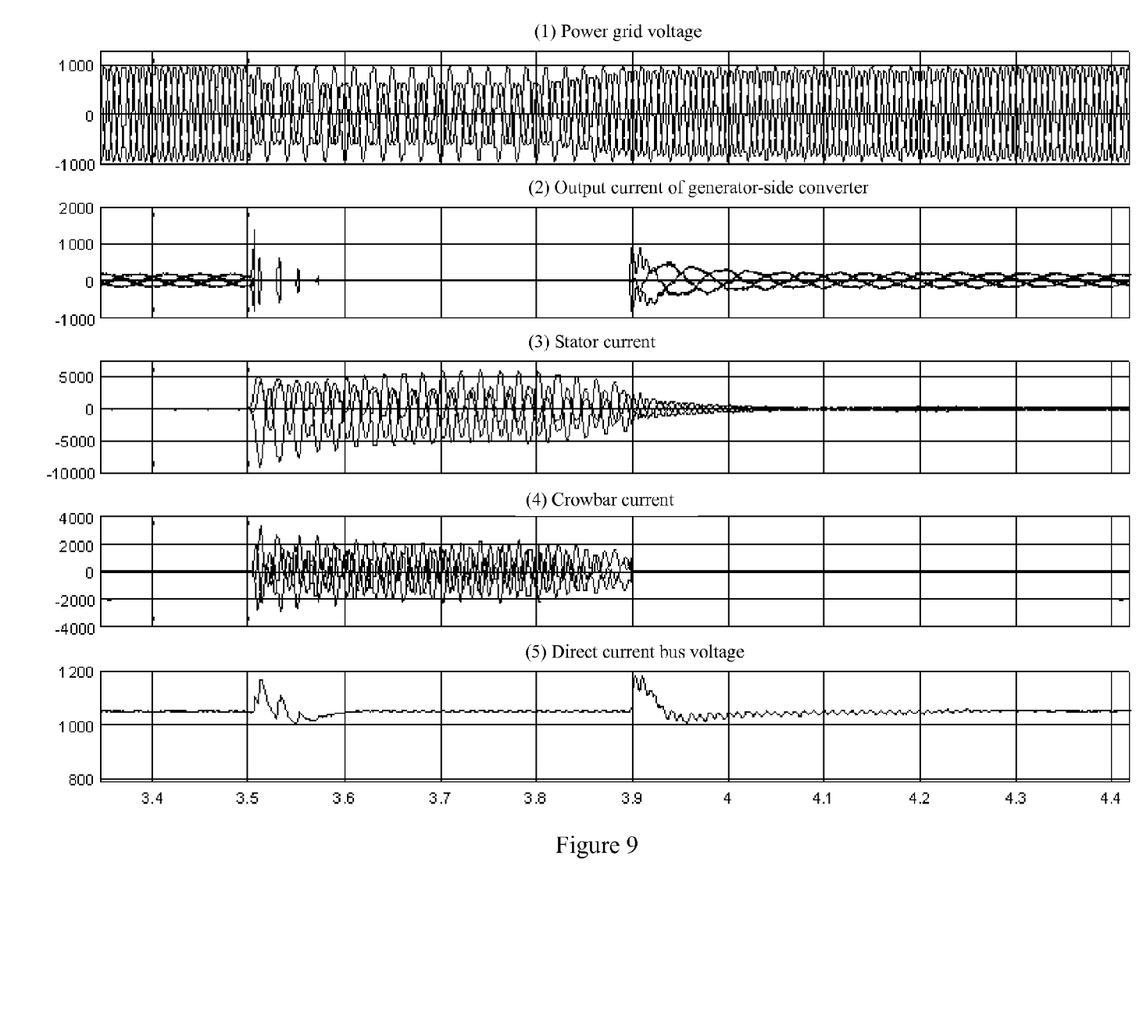
FIG. 9 is a waveform diagram of voltage waveform of the power grid, output current waveform of the generator-side converter, current waveform of the generator stator, current waveform on the energy consumption resistance of the crowbar device and voltage waveform of the direct current bus in the doubly fed induction generator system adopting the power grid fault ride-through device for doubly fed induction generator according to the invention, in case of asymmetric dip fault of the power grid.

In the above process, various key voltage and current waveforms are shown as FIG. 9, wherein (1) is the waveform of the power grid voltage, (2) is the waveform of the output current of the generator-side converter, (3) is the waveform of the generator stator current, (4) is the current waveform on the energy consumption resistance of the crowbar device, and (5) is the waveform of the direct current bus voltage.

The invention claimed is:

1. A power grid fault ride-through device for a doubly fed induction generator, comprising:
   a controller;
   a crowbar circuit comprising:
      a three-phase input end;
      a switch circuit comprising:
         a three-phase input end; and
         a bridge circuit comprising full-controlled power electronic devices as constituent elements; and
      a driving circuit;
   a doubly fed induction generator comprising:
      a generator-side converter; and
      a grid-side converter; and
   a du/dt inductance comprising a connection end;
   wherein:
      the controller is in controlled connection with the generator-side converter and the grid-side converter of the doubly fed induction generator and the crowbar circuit,
      the three-phase input end of the crowbar circuit is connected with the connection end of the du/dt inductance and the generator-side converter,
      the drive circuit is in driving connection with the switch circuit,
      the controller is in controlled connection with the drive circuit, and
      the three-phase input end of the switch circuit is connected to the three-phase input end of the crowbar circuit.

2. The power grid fault ride-through device for a doubly fed induction generator according to claim 1, wherein the bridge circuit of the switch circuit is a full bridge circuit.

3. The power grid fault ride-through device for a doubly fed induction generator according to claim 1, wherein the bridge circuit of the switch circuit is a half bridge circuit.

4. The power grid fault ride-through device for a doubly fed induction generator according to claim 1, wherein the crowbar circuit comprises an energy consumption resistance connected to the three-phase input end of the switch circuit.

5. The power grid fault ride-through device for a doubly fed induction generator according to claim 2, wherein the crowbar circuit comprises an energy consumption resistance connected to the three-phase input end of the switch circuit.

6. The power grid fault ride-through device for a doubly fed induction generator according to claim 3, wherein the crowbar circuit comprises an energy consumption resistance connected to the three-phase input end of the switch circuit.

7. The power grid fault ride-through device for a doubly fed induction generator according to claim 4, wherein the crowbar circuit comprises a detection circuit, and the detection circuit is in signal connection with the controller and the energy consumption resistance.

8. The power grid fault ride-through device for a doubly fed induction generator according to claim 5, wherein the crowbar circuit comprises a detection circuit, and the detection circuit is in signal connection with the controller and the energy consumption resistance.

9. The power grid fault ride-through device for a doubly fed induction generator according to claim 6, wherein the crowbar circuit comprises a detection circuit, and the detection circuit is in signal connection with the controller and the energy consumption resistance.

10. The power grid fault ride-through device for a doubly fed induction generator according to claim 7, wherein the crowbar circuit comprises a filter circuit, and the filter circuit comprises a three-phase connection end, and wherein the three-phase connection end of the filter circuit is connected to the three-phase input end at which the switch circuit is connected with the energy consumption resistance.

11. The power grid fault ride-through device for a doubly fed induction generator according to claim 8, wherein the crowbar circuit comprises a filter circuit, and the filter circuit comprises a three-phase connection end, and wherein the three-phase connection end of the filter circuit is connected to the three-phase input end at which the switch circuit is connected with the energy consumption resistance.

12. The power grid fault ride-through device for a doubly fed induction generator according to claim 9, wherein the crowbar circuit comprises a filter circuit, and the filter circuit comprises a three-phase connection end, and wherein the three-phase connection end of the filter circuit is connected to the three-phase input end at which the switch circuit is connected with the energy consumption resistance.

13. The power grid fault ride-through device for a doubly fed induction generator according to claim 1, wherein the crowbar circuit further comprises:
an energy consumption resistance;
a detection circuit; and
a filter circuit comprising a three-phase connection end;
wherein:
the energy consumption resistance is connected to the three-phase input end of the switch circuit,
the detection circuit is in signal connection with the controller and the energy consumption resistance, and
the three-phase connection end of the filter circuit is connected to the three-phase input end at which the switch circuit is connected with the energy consumption resistance.

14. The power grid fault ride-through device for a doubly fed induction generator according to claim 2, wherein the crowbar circuit further comprises:
an energy consumption resistance;
a detection circuit; and
a filter circuit comprising a three-phase connection end;
wherein:
the energy consumption resistance is connected to the three-phase input end of the switch circuit,
the detection circuit is in signal connection with the controller and the energy consumption resistance, and
the three-phase connection end of the filter circuit is connected to the three-phase input end at which the switch circuit is connected with the energy consumption resistance.

15. The power grid fault ride-through device for a doubly fed induction generator according to claim 3, wherein the crowbar circuit further comprises:
an energy consumption resistance;
a detection circuit; and
a filter circuit comprising a three-phase connection end;
wherein:
the energy consumption resistance is connected to the three-phase input end of the switch circuit,
the detection circuit is in signal connection with the controller and the energy consumption resistance, and
the three-phase connection end of the filter circuit is connected to the three-phase input end at which the switch circuit is connected with the energy consumption resistance.

16. A power grid fault ride-through method for a doubly fed induction generator, where the power grid fault ride-through device for a doubly fed induction generator comprises:
a controller;
a crowbar circuit comprising:
a three-phase input end;
a switch circuit comprising:
a three-phase input end; and
a bridge circuit comprising full-controlled power electronic devices as constituent elements; and
a driving circuit;
a doubly fed induction generator comprising:
a generator-side converter; and
a grid-side converter; and
a du/dt inductance comprising a connection end;
wherein:
the controller is in controlled connection with the generator-side converter and the grid-side converter of the doubly fed induction generator and the crowbar circuit,
the three-phase input end of the crowbar circuit is connected with the connection end of the du/dt inductance and the generator-side converter,
the drive circuit is in driving connection with the switch circuit,
the controller is in controlled connection with the drive circuit, and
the three-phase input end of the switch circuit is connected to the three-phase input end of the crowbar circuit, and
the method comprises the steps of:
the controller switching off the generator-side converter and triggering the crowbar circuit to achieve conduction of the switch circuit when a power grid voltage drops to a condition where a rotor current of the doubly fed induction generator rises to be equal or larger than a set conduction threshold value of the crowbar circuit.

17. The power grid fault ride-through method for a doubly fed induction generator according to claim 16, wherein the bridge circuit is either a full bridge circuit or a half bridge circuit.

18. A power grid fault ride-through method for a doubly fed induction generator, where the power grid fault ride-through device for a doubly fed induction generator comprises:
a controller;
a crowbar circuit comprising:
a three-phase input end;
a switch circuit comprising:
a three-phase input end; and
a bridge circuit comprising full-controlled power electronic devices as constituent elements; and
a driving circuit;
a doubly fed induction generator comprising:
a generator-side converter; and
a grid-side converter; and
a du/dt inductance comprising a connection end;
wherein:
the controller is in controlled connection with the generator-side converter and the grid-side converter of the doubly fed induction generator and the crowbar circuit,
the three-phase input end of the crowbar circuit is connected with the connection end of the du/dt inductance and the generator-side converter,
the drive circuit is in driving connection with the switch circuit,
the controller is in controlled connection with the drive circuit, and
the three-phase input end of the switch circuit is connected to the three-phase input end of the crowbar circuit, and
the method comprises the steps of:
the controller switching off the crowbar circuit to switch off the switch circuit and the controller switches on the generator-side converter to provide reactive power support for the power grid when a rotor current of the doubly fed induction generator attenuates to be equal to or less than a set switch-off threshold value of the crowbar circuit.

19. The power grid fault ride-through method for a doubly fed induction generator according to claim 18, wherein the bridge circuit is either a full bridge circuit or a half bridge circuit.

* * * * *